US010745216B2

(12) United States Patent
Wagner

(10) Patent No.: US 10,745,216 B2
(45) Date of Patent: Aug. 18, 2020

(54) STICKERS FOR DRYING AND/OR CURING MATERIALS

(71) Applicant: Pacific Western Timbers, Inc., Bremerton, WA (US)

(72) Inventor: John W. Wagner, Seabeck, WA (US)

(73) Assignee: Pacific Western Timbers, Inc., Bremerton, WA (US)

( * ) Notice: Subject to any disclaimer, the term of this patent is extended or adjusted under 35 U.S.C. 154(b) by 447 days.

(21) Appl. No.: 14/676,156

(22) Filed: Apr. 1, 2015

(65) Prior Publication Data
US 2016/0290717 A1 Oct. 6, 2016

(51) Int. Cl.
*B65G 57/00* (2006.01)
*F26B 25/18* (2006.01)
*B65G 1/14* (2006.01)

(52) U.S. Cl.
CPC .............. *B65G 57/005* (2013.01); *B65G 1/14* (2013.01); *F26B 25/185* (2013.01); *F26B 2210/16* (2013.01)

(58) Field of Classification Search
CPC .... F26B 25/00; F26B 2210/16; B65G 57/005; B65G 60/00; B65G 57/02; B65G 57/16
USPC ......... 34/239, 297, 282, 442, 188, 216, 217, 34/518; 144/371; 108/57.18
See application file for complete search history.

(56) References Cited

U.S. PATENT DOCUMENTS

| 2,343,410 | A | * | 3/1944 | Gottschalk | F26B 9/06 144/28 |
| 3,907,130 | A | * | 9/1975 | Hutcheson | B65G 1/0442 34/94 |
| 4,194,298 | A | * | 3/1980 | Hart | F26B 5/16 34/331 |
| 5,345,695 | A | * | 9/1994 | Graham | F26B 25/185 34/239 |

(Continued)

FOREIGN PATENT DOCUMENTS

| AT | 407242 B | * | 1/2001 | ............ F26B 25/185 |
| DE | 29902104 U1 | * | 6/1999 | ............ B65G 57/005 |
| EP | 0563887 A2 | * | 10/1993 | ............ H02B 1/306 |

OTHER PUBLICATIONS

80/20 Inc.; "80/20 Inc., 1010, 10 Series, 1" x 1" T-Slotted Extrusion x 97""; Apr. 11, 2012; Amazon.com; http://www.amazon.com/80-20-Series-T-Slotted-Extrusion/dp/B001F0F112.*

(Continued)

*Primary Examiner* — Jorge A Pereiro
*Assistant Examiner* — Logan P Jones
(74) *Attorney, Agent, or Firm* — Davis Wright Tremaine LLP; Heather M. Colburn

(57) ABSTRACT

A separator and/or stack stabilizer (referred to as a sticker) used to stack materials for drying and/or curing. The sticker has support members that extend radially outwardly from a central portion. An open-ended channel configured to allow air to flow therethrough is defined between each adjacent pair of support members. Together, the central portion and at least a portion of the support members may have an (Continued)

X-shaped cross-sectional shape. A different support platform having a support surface may be connected to each of the support members. Optionally, the support surfaces include airflow grooves. The sticker may be constructed entirely of a material that includes aluminum.

38 Claims, 6 Drawing Sheets

(56) References Cited

U.S. PATENT DOCUMENTS

| | | | | |
|---|---|---|---|---|
| 5,704,134 A * | 1/1998 | Carter | ............ | F26B 25/185 |
| | | | | 211/59.4 |
| 5,813,137 A * | 9/1998 | Townsend | ............ | B27C 5/00 |
| | | | | 248/346.01 |
| 5,950,720 A * | 9/1999 | Klix | ............ | F24D 3/165 |
| | | | | 165/179 |
| 6,134,803 A * | 10/2000 | Gilchrist | ............ | F26B 25/185 |
| | | | | 34/239 |
| 6,243,970 B1 * | 6/2001 | Culp | ............ | F26B 21/02 |
| | | | | 34/218 |
| 6,345,652 B1 * | 2/2002 | Townsend | ............ | B27C 5/00 |
| | | | | 144/116 |
| RE38,118 E * | 5/2003 | Townsend | ............ | B27C 5/00 |
| | | | | 248/346.01 |
| 7,003,898 B2 * | 2/2006 | Aaron | ............ | F26B 25/185 |
| | | | | 34/239 |
| 7,926,199 B2 * | 4/2011 | Aaron | ............ | F26B 25/185 |
| | | | | 248/346.02 |
| 8,209,917 B1 * | 7/2012 | DeZaio | ............ | E04C 2/384 |
| | | | | 52/285.3 |
| 2005/0028399 A1 * | 2/2005 | Merschat | ............ | F26B 5/045 |
| | | | | 34/92 |

OTHER PUBLICATIONS

Dough_baker; "Using aluminium sticker for air drying"; Feb. 18, 2015; The Forestry Forum; http://forestryforum.com/board/index.php?topic=814237.0.*

* cited by examiner

STICKERS FOR DRYING AND/OR CURING MATERIALS

BACKGROUND OF THE INVENTION

Field of the Invention

The present invention is directed generally to separators and stack stabilizers placed in between boards or sheets stacked atop one another and placed in a kiln or otherwise allowed to dry or cure.

Description of the Related Art

Green lumber must be dried before it can be used as a construction material. Typically, green lumber is stacked and placed in a kiln to dry. Separators and/or stack stabilizers (referred to as "stickers") are placed in between boards stacked atop one another to allow air to circulate in between the boards.

Similarly, many sheet materials (such as cement board) are formed (e.g., extruded), stacked, and allowed to dry or cure. Stickers are placed in between vertically adjacent sheets stacked atop one another to allow air to circulate in between the vertically adjacent sheets.

Stickers are typically constructed from wood. A common problem caused by conventional wooden stickers is "sticker stain" or "sticker shadow" (referred to hereafter as "sticker stain"), which is a stain on the wood or sheet material caused by uneven drying or curing. Sticker stain typically appears at those locations whereat stickers contacted the wood or sheet during drying or curing. Further, because mold can grow on and in wooden stickers, after becoming contaminated with mold (e.g., by lumber), the contaminated stickers can transfer that mold to other materials during subsequent uses. Thus, wooden stickers can transfer mold (and sticker stain) between different surfaces during consecutive uses. Another problem associated with using conventional wooden stickers is that they may be warped or non-uniform, which causes lumber to warp during drying. Additionally, wooden stickers have a useful life of only about three years. Therefore, a need exists for stickers that avoid one or more of these shortcomings. For example, stickers that avoid causing sticker stain would be particularly desirable, as would stickers that help prevent lumber and sheet materials from warping. The present application provides these and other advantages as will be apparent from the following detailed description and accompanying figures.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
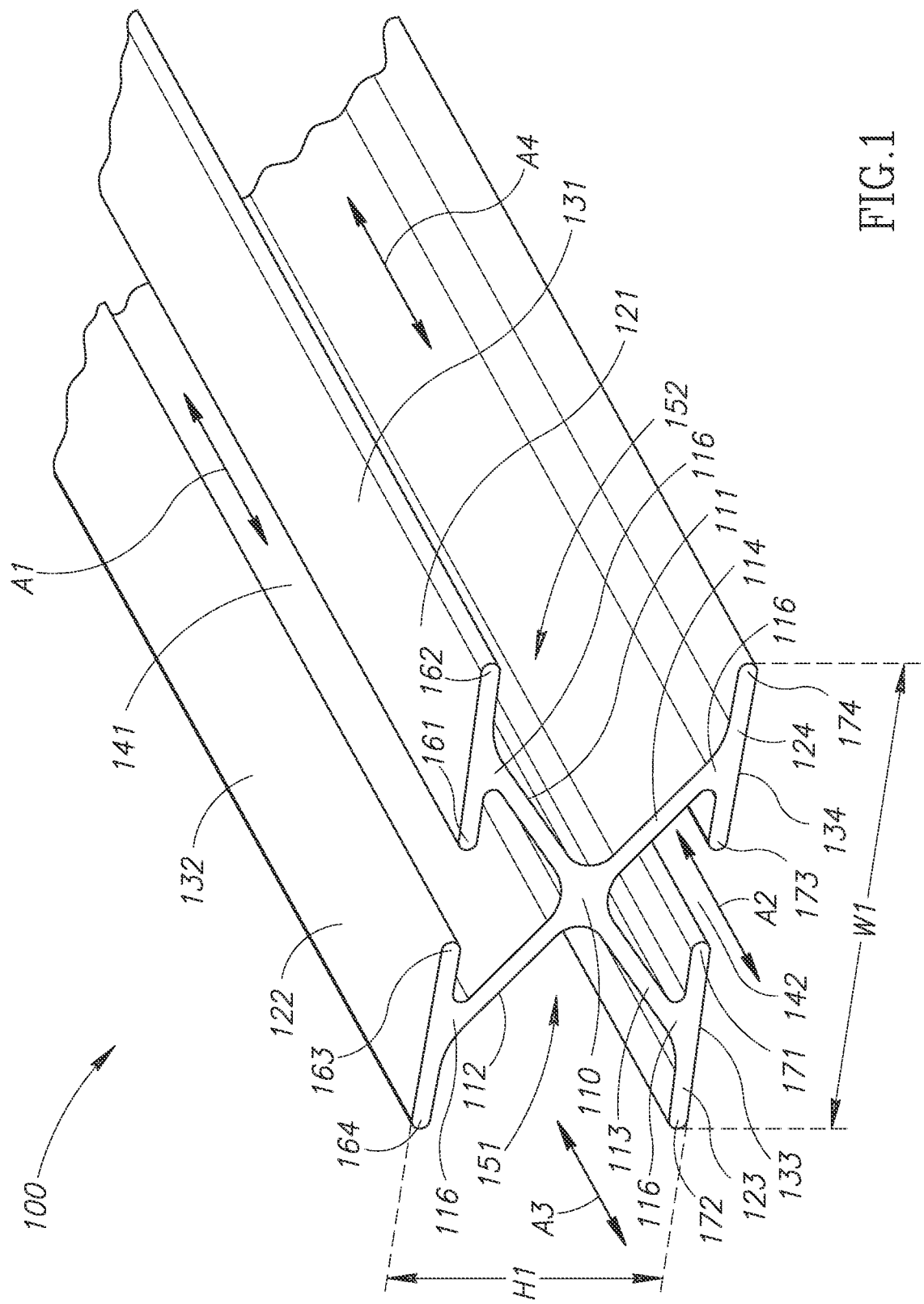
FIG. 1 is a perspective view of a first embodiment of a sticker.

FIG. 1 depicts a first embodiment of a separator, referred to herein as a sticker 100. The sticker 100 may also be characterized as being a pack or stack stabilizer. The sticker 100 has a central portion 110 and support arms or members 111-114 that extend radially outwardly from the central portion 110. By way of a non-limiting example, the sticker 100 may have a width W1 of about 1.0 inch to about 1.5 inches and a height H1 of about 0.5 inches to about 1.0 inch. The sticker 100 may have any suitable length (e.g., about 4 feet, about 6 feet, and about 8 feet). In some embodiments, the sticker 100 may have a length from about 42 inches to about 48 inches. By way of a non-limiting example, a plurality of stickers each like the sticker 100 may be manufactured by forming an extrusion that has the cross-sectional shape of the sticker 100 and a maximum length (e.g., about 40 feet). Then, the extrusion may be cut laterally into two or more sections (e.g., each having a length of about 4 feet, about 6 feet, about 8 feet, and the like) with each of the sections being one of the plurality of stickers.

In the embodiment illustrated, the central portion 110 and the support members 111-114 define a generally X-shaped cross-sectional shape. Thus, the support members 111 and 113 are substantially collinear, and the support members 112 and 114 are substantially collinear. Further, an inside angle defined between the support members 111 and 112 is substantially equal to an inside angle defined between the support members 113 and 114, and an inside angle defined between the support members 111 and 114 is substantially equal to an inside angle defined between the support members 112 and 113. Further, in the embodiment illustrated, the inside angle defined between the support members 111 and 112 (and the inside angle defined between the support members 113 and 114) is greater than 90° and the inside angle defined between the support members 111 and 114 (and the inside angle defined between the support members 112 and 113) is less than 90°. However, these inside angles may be adjusted to achieve a desired cross-sectional shape. For example, each of these inside angles may be about 90°. Alternatively, the inside angle defined between the support members 111 and 112 may be different from the inside angle defined between the support members 113 and 114, and the inside angle defined between the support members 111 and 114 may be different from the inside angle defined between the support members 112 and 113.

Each of the support members 111-114 has an end 116 opposite the central portion 110. Support platforms 121-124 are connected to the ends 116 of the support members 111-114, respectively. Thus, each of the support platforms 121-124 is spaced part from the central portion 110. Further, the support members 111-114 may be characterized as terminating at or being terminated by the support platforms 121-124, respectively. In the embodiment illustrated, each of the central portion 110, the support members 111-114, and the support platforms 121-124 is elongated and extends along a longitudinal axis 182 (see FIG. 2).

The support platforms 121 and 122 have outwardly facing substantially coplanar support surfaces 131 and 132, respectively. A substantially flat surface of an object may be placed upon both of the support surfaces 131 and 132 at the same time. Alternatively, the support surfaces 131 and 132 may rest upon a substantially flat surface of an object at the same time.

The support platforms 123 and 124 have outwardly facing substantially coplanar support surfaces 133 and 134, respectively. A substantially flat surface of a material (e.g., a board, a sheet, and the like) may be placed upon both of the support surfaces 133 and 134 at the same time. Alternatively, the support surfaces 133 and 134 may rest upon a substantially flat surface at the same time.

The support surfaces 131 and 132 both face in a first direction, and the support surfaces 133 and 134 both face in a second direction that is opposite the first direction. The support surfaces 131 and 132 are substantially parallel with the support surfaces 133 and 134. In the embodiment illustrated, the support surfaces 131 and 132 are substantially identical to the support surfaces 134 and 133, respectively. The sticker 100 may be used with the support surfaces 131 and 132 facing upwardly (and the support surfaces 133 and 134 facing downwardly) or alternatively, with the support surfaces 133 and 134 facing upwardly (and the support surfaces 131 and 132 facing downwardly).

The support platforms 121-124 are spaced apart from one another. An open-ended channel 141 is positioned between and extends longitudinally alongside the support platforms 121 and 122 and the support members 111 and 112. Similarly, an open-ended channel 142 is positioned between and extends longitudinally alongside the support platforms 123 and 124 and the support members 113 and 114. Air may flow longitudinally through the open-ended channels 141 and 142 in directions identified by double-headed arrows A1 and A2, respectively. Further, air within the channel 141 may flow laterally outwardly therefrom between the support platforms 121 and 122. Similarly, air within the channel 142 may flow laterally outwardly therefrom between the support platforms 123 and 124. The longitudinal airflows through the channels 141 and 142 (identified by the arrows "A1" and "A2") and the lateral airflows therefrom help avoid sticker stain.

The sticker 100 has a smaller cross-sectional area than a conventional wooden sticker, which has a generally square or rectangular cross-sectional shape. Further, a conventional wooden sticker has continuous upper and lower surfaces. Thus, conventional wooden stickers cannot provide the airflows (identified by the arrows "A1" and "A2") present when the sticker 100 is used. Further, even if conventional wooden stickers having a width substantially identical to the width W1 were to be constructed, the upper and lower surfaces of such wooden stickers would contact and cover larger portions of those materials immediately above and below the wooden sticker than would be covered by the support surfaces 131-134 of the sticker 100. Larger covered portions take longer to dry and are more susceptible to sticker stain. As described above, in the sticker 100, the channel 141 separates the support surfaces 131 and 132 from one another, and the channel 142 separates the support surfaces 133 and 134 from one another. These separations reduce an amount of the material immediately above the sticker 100 that is covered by the support surfaces 131 and 132 and an amount of the material immediately below the sticker 100 that is covered by the support surfaces 133 and 134 allowing those immediately adjacent (or covered) areas to dry faster and making them less susceptible to sticker stain.

An open-ended side channel 151 is positioned between and extends longitudinally alongside the support platforms 122 and 123 and the support members 112 and 113. Similarly, an open-ended side channel 152 is positioned between and extends longitudinally alongside the support platforms 121 and 124 and the support members 111 and 114. Air may flow longitudinally through the side channels 151 and 152 in directions identified by double-headed arrows A3 and A4, respectively.

As shown in FIG. 1, the channels 141, 142, 151, and 152 are arranged around the central portion 110. The longitudinal airflows (identified by the arrows "A1" to "A4") through the channels 141, 142, 151, and 152 and the lateral airflows between the support platforms 121-124 help stacked materials separated by the sticker 100 receive adequate air circulation to facilitate drying and/or curing. This allows the stacked materials (e.g., lumber, cement board, and the like) to dry and/or cure consistently.

In the embodiment illustrated, an inner edge portion 161 of the support platform 121 extends into the open-ended channel 141 and overhangs (or laterally obstructs) a portion of the open-ended channel 141 adjacent the support platform 121. An outer edge portion 162 of the support platform 121 extends outwardly beyond the support member 111 and extends the side channel 152 outwardly beyond the support members 111 and 114. In other words, the inner and outer edge portions 161 and 162 may be characterized as being cantilevered with respect to the support member 111.

In the embodiment illustrated, an inner edge portion 163 of the support platform 122 extends into the open-ended channel 141 and overhangs (or laterally obstructs) a portion of the open-ended channel 141 adjacent the support platform 122. An outer edge portion 164 of the support platform 122 extends outwardly beyond the support member 112 and extends the open-ended side channel 151 outwardly beyond the support members 112 and 113. In other words, the inner and outer edge portions 163 and 164 may be characterized as being cantilevered with respect to the support member 112.

In the embodiment illustrated, an inner edge portion 171 of the support platform 123 extends into the open-ended channel 142 and overhangs (or laterally obstructs) a portion of the open-ended channel 142 adjacent the support platform 123. An outer edge portion 172 of the support platform 123 extends outwardly beyond the support member 113 and extends the open-ended side channel 151 outwardly beyond the support members 112 and 113. In other words, the inner and outer edge portions 171 and 172 may be characterized as being cantilevered with respect to the support member 113.

In the embodiment illustrated, an inner edge portion 173 of the support platform 124 extends into the open-ended channel 142 and overhangs (or laterally obstructs) a portion of the open-ended channel 142 adjacent the support platform 124. An outer edge portion 174 of the support platform 124 extends outwardly beyond the support member 114 and extends the side channel 152 outwardly beyond the support members 111 and 114. In other words, the inner and outer edge portions 173 and 174 may be characterized as being cantilevered with respect to the support member 114.

Figure 2:
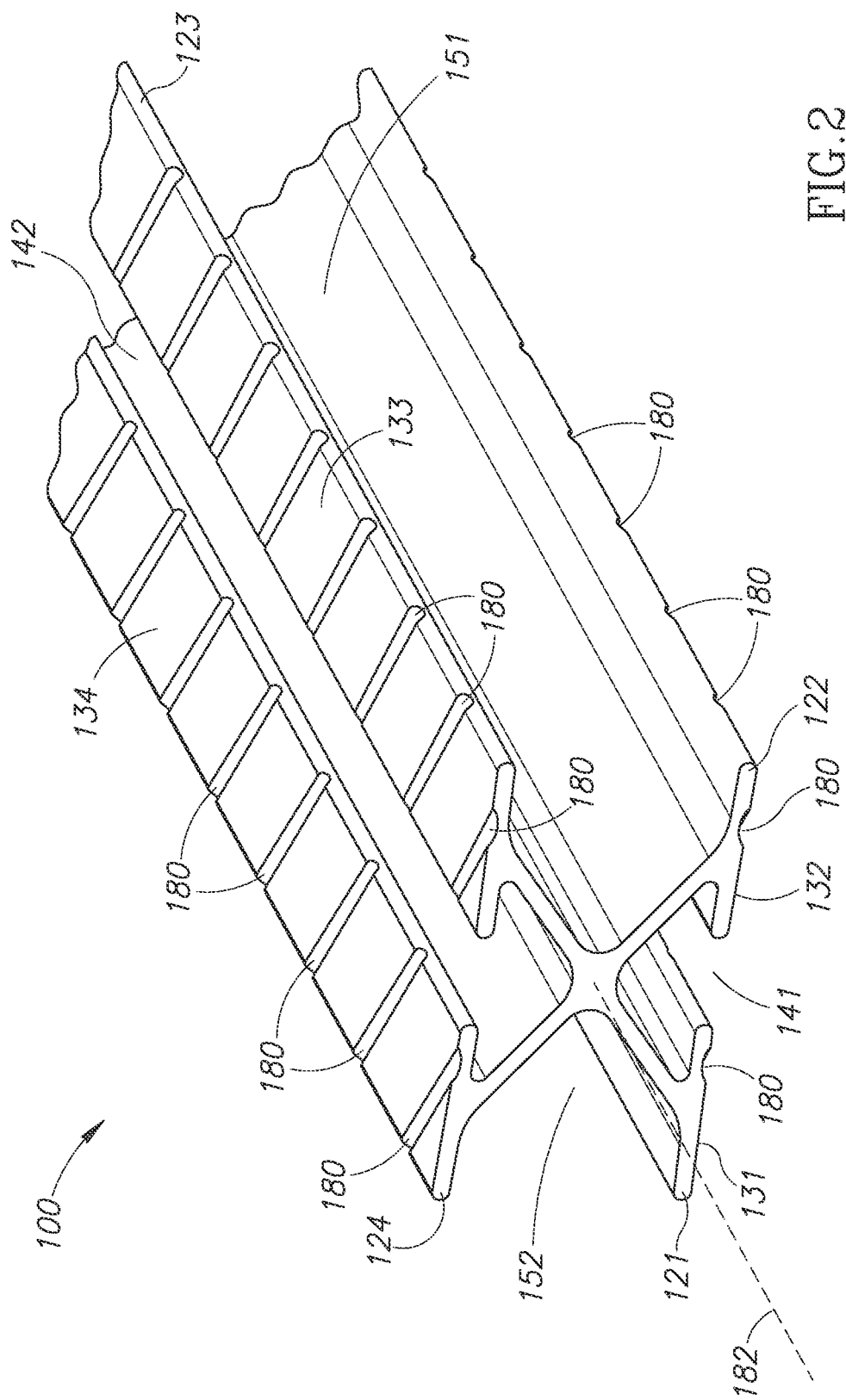
FIG. 2 is a perspective view of the sticker of FIG. 1 including optional grooves and rotated 180° about its longitudinal axis.

FIG. 2 depicts an embodiment of the sticker 100 that includes optional airflow (or cross ventilation) cuts or grooves 180 formed in each of the support surfaces 131-134. Each of the airflow grooves 180 opens into at least one of the channels 141, 142, 151, and 152. Air may flow into the airflow grooves 180 (e.g., from one or more of the channels 141, 142, 151, and 152 or outside the sticker 100) to help evaporate any liquids or moisture adjacent or alongside the grooves 180. While the airflow grooves 180 have been illustrated as extending at an angle other than perpendicular to or parallel with the longitudinal axis 182 of the sticker 100, in alternate embodiments, the airflow grooves 180 may be substantially perpendicular to the longitudinal axis 182. By way of another non-limiting example, the airflow grooves 180 may extend longitudinally (or substantially parallel to the longitudinal axis 182). Further, the airflow grooves 180 may be tapered or non-linear. Air flowing through the airflow grooves 180 may create vortices or turbulence that helps prevent sticker stain. Further, air flowing through the airflow grooves 180 helps increase a rate at which materials immediately adjacent to the sticker 100 dry and/or cure.

An amount of weight that the sticker 100 may support is determined at least in part by the thickness of the central portion 110, the support members 111-114, and the support platforms 121-124. Thus, the sticker 100 may be made stronger (and able to support more weight) by increasing the thickness of the central portion 110, the support members 111-114, and/or the support platforms 121-124.

Figure 3:
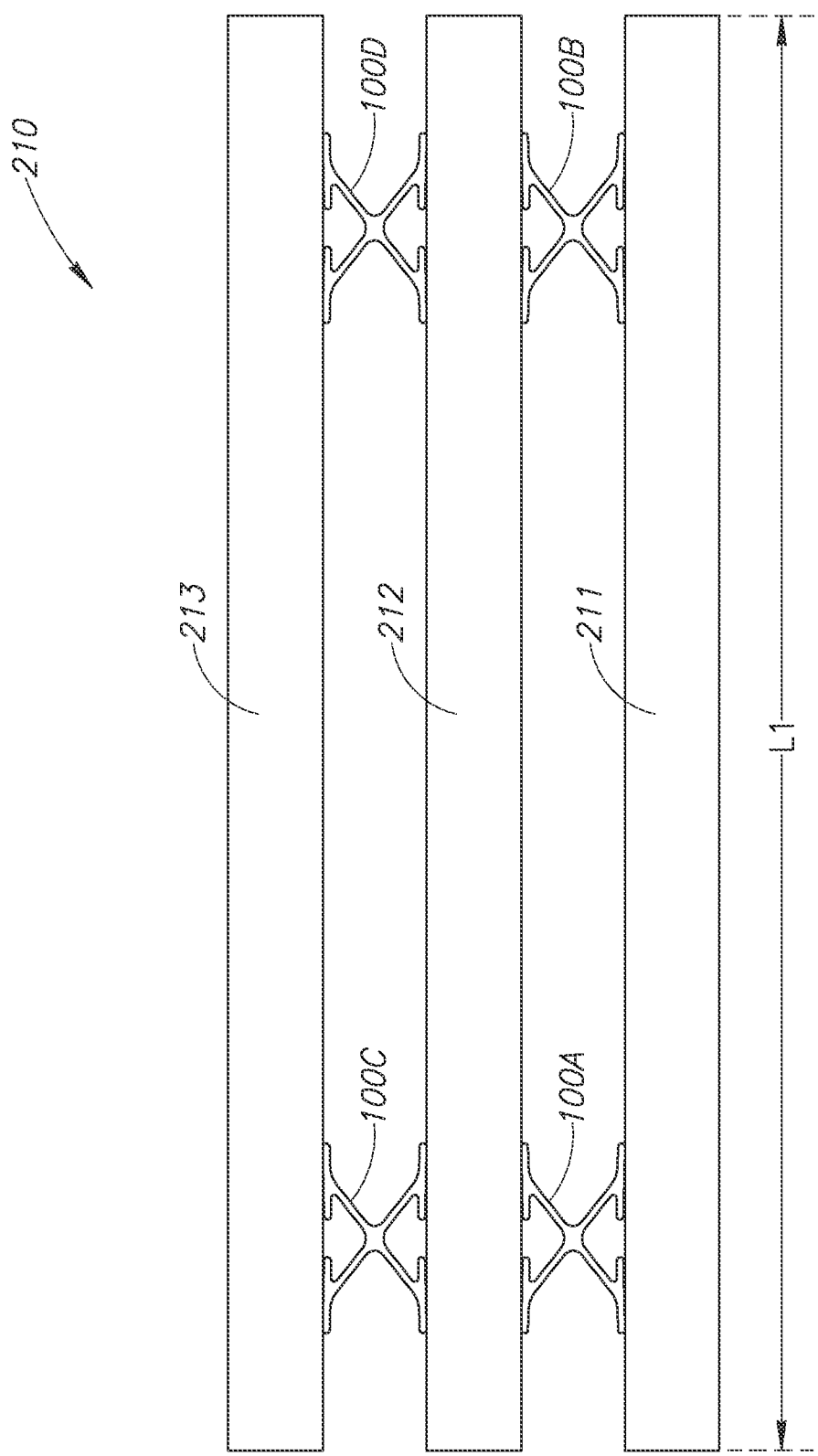
FIG. 3 is a side view of a stack that includes four stickers like the sticker of FIG. 1.

FIG. 3 is a side view of a stack 210 formed by stickers 100A-100D and items 211-213. Each of the stickers 100A-100D is like the sticker 100. The items 211-213 may each be a wooden board, a sheet material, and the like. For example, the items 211-213 may be cement boards or similar sheet materials that dry and/or cure.

In the stack 210, the stickers 100A and 100B are positioned in between the second item 212 stacked atop the first item 211, and the stickers 100C and 100D are depicted positioned in between the third item 213 stacked atop the second item 212. The stickers 100A-100D separate vertically adjacent items in the stack 210 and help stabilize the stack 210. While FIG. 3 depicts only two stickers (e.g., the stickers 100A and 100B) positioned between each pair of vertically adjacent items (e.g., the items 211 and 212) in the stack 210, any number of stickers may be used. For example, when the items 211-213 are lumber, the items 211-213 may have a length "L1" of approximately 20 feet. In such embodiments, more than two stickers like the sticker 100 may be used in between each vertically adjacent pair of boards in the stack 210.

Referring to FIG. 1, the support members 111-114 and/or the support platforms 121-124 are each configured to flex, twist, bend, and/or otherwise elastically deform laterally and/or longitudinally when a sufficient amount of force is applied thereto. Further, the sticker 100 may flex, twist, bend, and/or otherwise elastically deform longitudinally to conform to any materials (e.g., the items 211-213 depicted in FIG. 3) stacked thereupon. Thus, the sticker 100 avoids denting or otherwise damaging such materials. Additionally, while the sticker 100 may flex and/or deflect longitudinally, the sticker 100 resists such deflection and tries to return to its original shape. For example, along its length, the sticker 100 is substantially straight and after deflecting laterally, returns to being substantially straight. Thus, the sticker 100 pushes against those materials with which it has been stacked to help keep those materials substantially straight and/or flat. In other words, the sticker 100 helps prevent materials (e.g., lumber, cement board, and the like) from warping. For example, referring to FIG. 3, the sticker 100 pushes against the items 211-213 and helps keep them substantially straight and/or flat.

While the support surfaces 131-134 have been described and illustrated as being substantially planar, in alternate embodiments, the support surfaces 131-134 may each be contoured. Such contours may help the support platforms 121-124 better conform to the materials adjacent the sticker 100 within a stack to reduce damage (e.g., dents) to those materials caused by the sticker 100. For example, each of the support surfaces 131-134 may be concave (or cupped) such the inner and outer edge portions 161 and 162 of the support platform 121 curve outwardly away from the support member 111, the inner and outer edge portions 163 and 164 of the support platform 122 curve outwardly away from the support member 112, the inner and outer edge portions 171 and 172 of the support platform 123 curve outwardly away from the support member 113, and the inner and outer edge portions 173 and 174 of the support platform 124 curve outwardly away from the support member 114.

Figure 4:
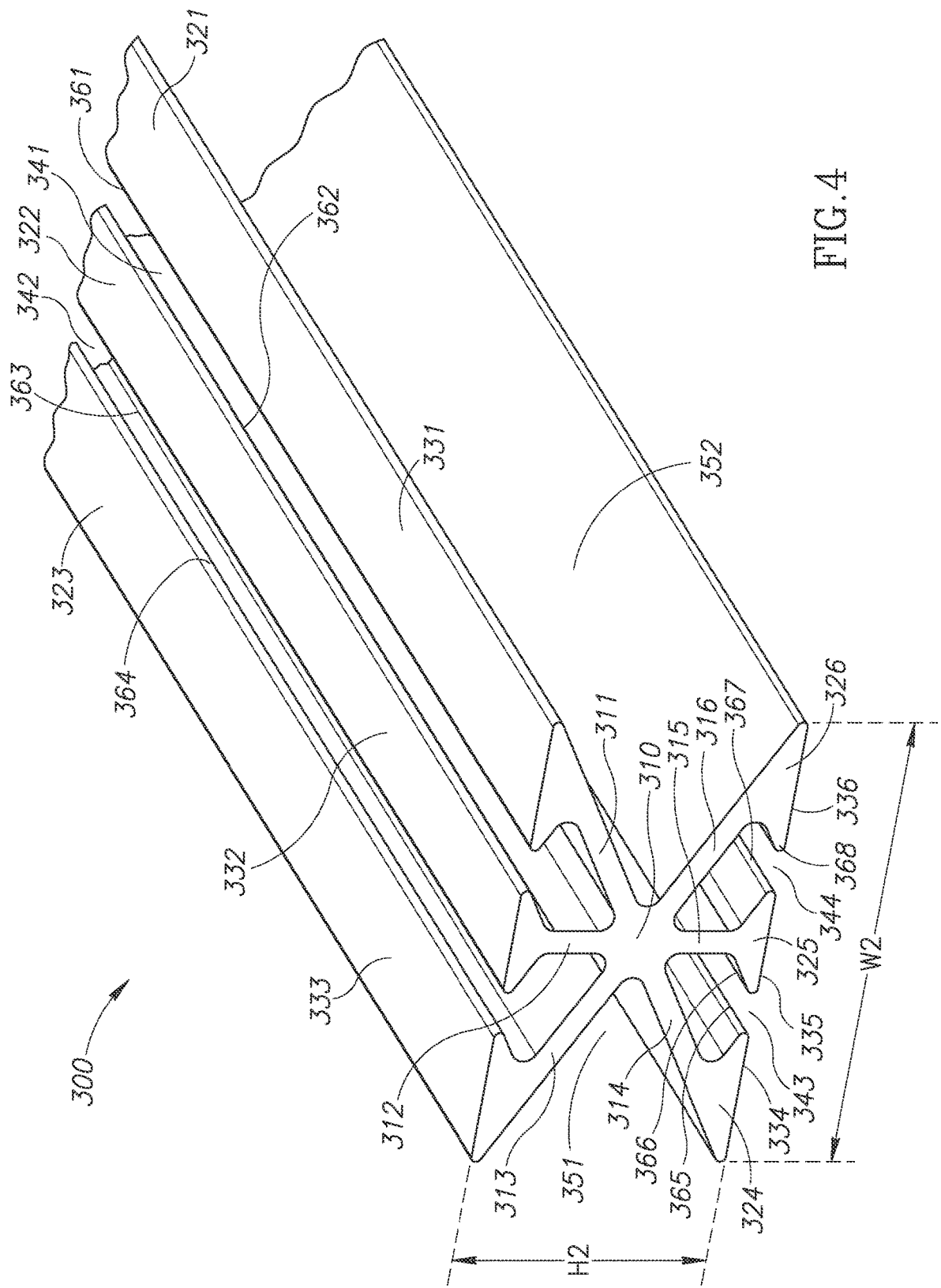
FIG. 4 is a perspective view of a second embodiment of a sticker.

FIG. 4 depicts a second embodiment of a sticker 300. The sticker 300 has a central portion 310 and support arms or members 311-316 that extend radially outwardly from the central portion 310. By way of a non-limiting example, the sticker 300 may have a width W2 of about 1.0 inch to about 1.5 inches and a height H2 of about 0.5 inches to about 1.0 inch. The sticker 300 may have any length discussed above as being suitable for constructing the sticker 100 (see FIGS. 1-3). Further, the sticker 300 may be constructed in the same manner and using the same materials as the sticker 100 (see FIGS. 1-3).

The outwardly extending support members 311-316 are terminated by support platforms 321-326, respectively. Thus, the support platforms 321-326 are spaced apart from the central portion 310 and one another. The support platform 322 is positioned between the support platforms 321 and 323, and the support platform 325 is positioned between the support platforms 324 and 326.

The support platforms 321-323 have outwardly facing coplanar support surfaces 331-333, respectively. A substantially flat surface of an object may be placed upon all of the support surfaces 331-333 at the same time. Alternatively, the support surfaces 331-333 may rest upon a substantially flat surface of an object at the same time.

The support platforms 324-326 have outwardly facing coplanar support surfaces 334-336, respectively. A substantially flat surface of a material (e.g., a board, a sheet, and the like) may be placed upon all of the support surfaces 334-336 at the same time. Alternatively, the support surfaces 334-336 may rest upon a substantially flat surface at the same time.

The support surfaces 331-333 all face a first direction, and the support surfaces 334-336 all face in a second direction that is opposite the first direction. The support surfaces 331-333 are substantially parallel with the support surfaces 334-336. In the embodiment illustrated, the support surfaces 331-333 are substantially identical to the support surfaces 336-334, respectively. The sticker 300 may be used with the support surfaces 331-333 facing upwardly (and the support surfaces 334-336 facing downwardly) or alternatively, with the support surfaces 334-336 facing upwardly (and the support surfaces 331-333 facing downwardly).

Together the central portion 310 and the support members 311, 313, 314, and 316 have a cross-section shape that is substantially similar to that of the central portion 110 (see FIG. 1) and the support members 111-114 (see FIGS. 1 and 2) of the sticker 100 (see FIGS. 1-3). In the embodiment illustrated, the central portion 310 and the support members 311, 313, 314, and 316 have been depicted as having a generally X-shaped cross-section shape. However, as explained above with respect to the sticker 100, this is not a requirement.

In the embodiment illustrated, the support members 312 and 315 are substantially collinear with each of the support members 312 and 315 being substantially vertical and substantially planar. Further, each of the support platforms 322 and 325 has a substantially horizontal orientation. Together, the central portion 310, the support members 312 and 315, and the support platforms 322 and 325 have an I-beam shaped cross-sectional shape that provides additional strength beyond that provided by the central portion 310, the support members 311, 313, 314, and 316 and the support platforms 321, 323, 324, and 326 alone. Thus, the sticker 300 may support more weight (and, therefore, be used to construct taller stacks) than the sticker 100 (see FIGS. 1-3). Further, the sticker 300 may be used to stack thicker and/or heavier materials. However, depending upon the implementation details, the sticker 300 may require more material (e.g., aluminum, aluminum alloy, plastic, and the like) to manufacture than the sticker 100. The sticker 300 may be made stronger by increasing the thickness of the central portion 310, the support members 311-316, and/or the support platforms 321-326.

An open-ended channel 341 is positioned between and extends longitudinally alongside the support platforms 321 and 322 and the support members 311 and 312. Similarly, an open-ended channel 342 is positioned between and extends longitudinally alongside the support platforms 322 and 323 and the support members 312 and 313. Further, an open-ended channel 343 is positioned between and extends longitudinally alongside the support platforms 324 and 325 and the support members 314 and 315. Additionally, an open-ended channel 344 is positioned between and extends longitudinally alongside the support platforms 325 and 326 and the support members 315 and 316.

Air may flow longitudinally through the open-ended channels 341-344. Further, air within the channel 341 may flow laterally outwardly therefrom between the support platforms 321 and 322, and air within the channel 342 may flow laterally outwardly therefrom between the support platforms 322 and 323. Similarly, air within the channel 343 may flow laterally outwardly therefrom between the support platforms 324 and 325, and air within the channel 344 may flow laterally outwardly therefrom between the support platforms 325 and 326. The longitudinal airflows through the channels 341-344 and the lateral airflows therefrom help avoid sticker stain.

As discussed above, with respect to the sticker 100 (see FIGS. 1-3), conventional wooden stickers that have a generally square or rectangular cross-sectional shape with continuous upper and lower surfaces cannot provide airflows through channels (like the channels 341-344). Further, these upper and lower surfaces contact and cover larger portions of those materials immediately above and below the wooden sticker than would be covered by the support surfaces 331-336 of the sticker 300. The sticker 300 reduces dry time and/or reduces and/or eliminates sticker stain because the channel 341 separates the support surfaces 331 and 332 from one another, the channel 342 separates the support surfaces 332 and 333 from one another, the channel 343 separates the support surfaces 334 and 335 from one another, and the channel 344 separates the support surfaces 335 and 336 from one another. These separations reduce an amount of the material immediately above the sticker 300 that is covered by the support surfaces 331-333 and an amount of the material immediately below the sticker 300 that is covered by the support surfaces 334-336 allowing those immediately adjacent (or covered) areas to dry faster and making them less susceptible to sticker stain.

An open-ended side channel 351 is positioned between and extends longitudinally alongside the support platforms 323 and 324 and the support members 313 and 314. Similarly, an open-ended side channel 352 is positioned between and extends longitudinally alongside the support platforms 321 and 326 and the support members 311 and 316. Air may flow longitudinally through the open-ended side channels 351 and 352.

As shown in FIG. 4, the channels 341-344, 351, and 352 are arranged around the central portion 310. The longitudinal airflows through the channels 341-344, 351, and 352 and the lateral airflows between the support platforms 321-326 help stacked materials separated by the sticker 300 receive adequate air circulation to facilitate drying and/or curing. This allows the stacked materials (e.g., lumber, cement board, and the like) to dry and/or cure consistently.

In the embodiment illustrated, an inner edge portion 361 of the support platform 321 extends into the open-ended channel 341 and overhangs (or laterally obstructs) a portion of the open-ended channel 341 adjacent the support platform 321. In other words, the inner edge portion 361 may be characterized as being cantilevered with respect to the support member 311.

In the embodiment illustrated, a longitudinally extending first edge portion 362 of the support platform 322 extends into the open-ended channel 341 and overhangs (or laterally obstructs) a portion of the open-ended channel 341 adjacent the support platform 322, and a longitudinally extending second edge portion 363 of the support platform 322 extends into the open-ended channel 342 and overhangs (or laterally obstructs) a portion of the open-ended channel 342 adjacent the support platform 322. In other words, the first and second edge portions 362 and 363 may be characterized as being cantilevered with respect to the support member 312.

In the embodiment illustrated, an inner edge portion 364 of the support platform 323 extends into the open-ended channel 342 and overhangs (or laterally obstructs) a portion of the open-ended channel 342 adjacent the support platform 323. In other words, the inner edge portion 364 may be characterized as being cantilevered with respect to the support member 313.

In the embodiment illustrated, an inner edge portion 365 of the support platform 324 extends into the open-ended channel 343 and overhangs (or laterally obstructs) a portion of the open-ended channel 343 adjacent the support platform 324. In other words, the inner edge portion 365 may be characterized as being cantilevered with respect to the support member 314.

In the embodiment illustrated, a longitudinally extending first edge portion 366 of the support platform 325 extends into the open-ended channel 343 and overhangs (or laterally obstructs) a portion of the open-ended channel 343 adjacent the support platform 325, and a longitudinally extending second edge portion 367 of the support platform 325 extends into the open-ended channel 344 and overhangs (or laterally obstructs) a portion of the open-ended channel 344 adjacent the support platform 325. In other words, the first and second edge portions 366 and 367 may be characterized as being cantilevered with respect to the support member 315.

In the embodiment illustrated, an inner edge portion 368 of the support platform 326 extends into the open-ended channel 344 and overhangs (or laterally obstructs) a portion of the open-ended channel 344 adjacent the support platform 326. In other words, the inner edge portion 368 may be characterized as being cantilevered with respect to the support member 316.

Like the sticker 100 (see FIG. 1-3), the sticker 300 may flex and/or deflect longitudinally. Along its length, the sticker 300 is substantially straight and after deflecting laterally, returns to being substantially straight. Further, the sticker 300 resists such deflection and tries to return to its original shape. Thus, the sticker 300 pushes against those materials with which it has been stacked to help keep those materials substantially straight and/or flat. In other words, the sticker 300 helps prevent materials (e.g., lumber, cement board, and the like) from warping.

Figure 5:
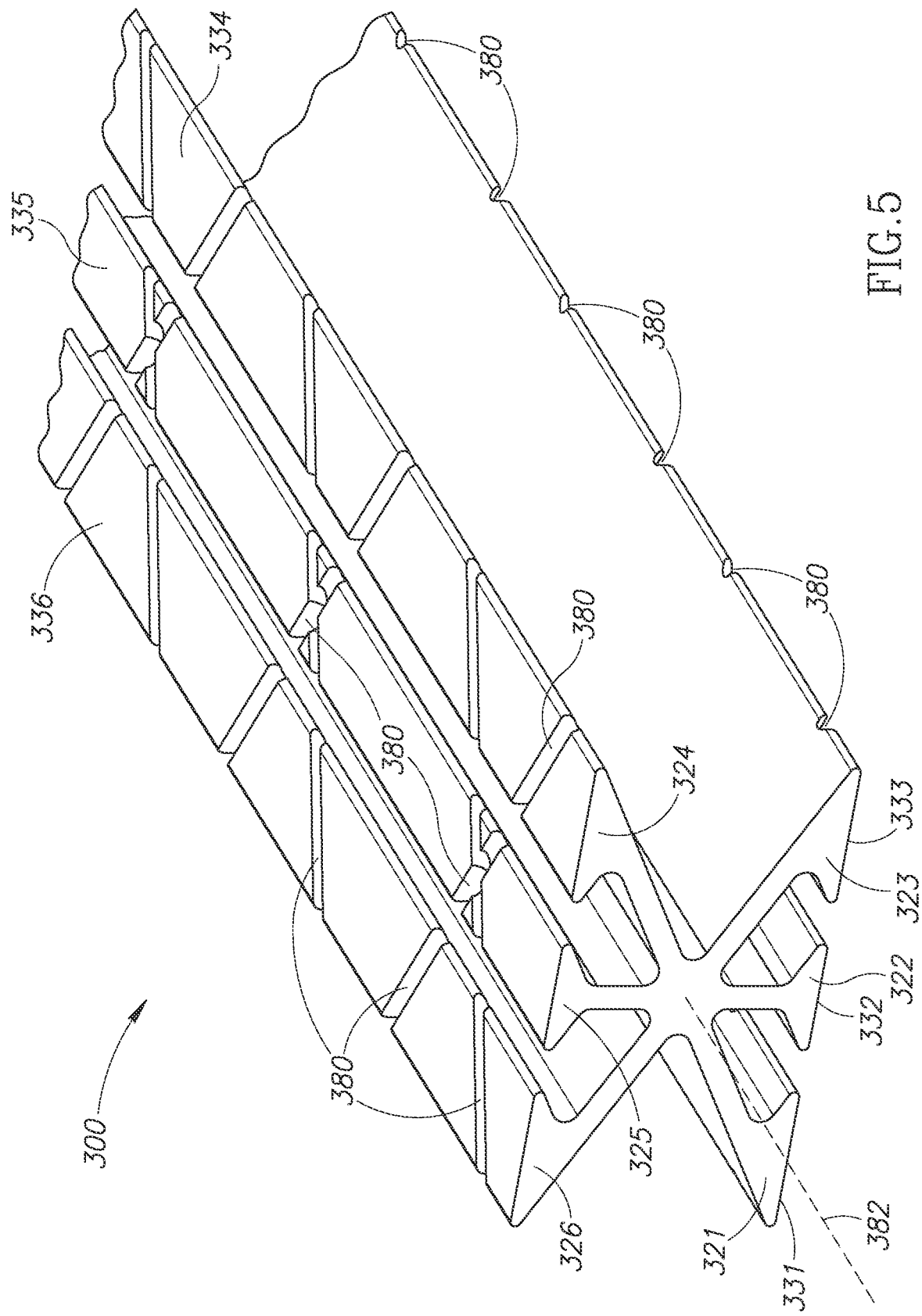
FIG. 5 is a perspective view of the sticker of FIG. 4 including optional grooves and rotated 180° about its longitudinal axis.

FIG. 5 depicts an embodiment of the sticker 300 that includes optional airflow (or cross ventilation) cuts or grooves 380 formed in each of the support surfaces 331-336. Each of the airflow grooves 380 opens into at least one of the channels 341-344, 351, and 352. In the embodiment illustrated, the grooves 380 are arranged in longitudinally repeating X-shaped patterns. Air may flow into the airflow grooves 380 (e.g., from one or more of the channels 341-344, 351, and 352 or outside the sticker 300) to help evaporate any liquids or moisture adjacent or alongside the grooves 380. While the airflow grooves 380 have been illustrated as extending at angles other than perpendicular to or parallel with a longitudinal axis 382 of the sticker 300, in alternate embodiments, the airflow grooves 380 may be substantially perpendicular to the longitudinal axis 382. By way of another non-limiting example, the airflow grooves 380 may extend longitudinally (or substantially parallel to the longitudinal axis 382). Further, the airflow grooves 380 may be tapered or non-linear. Air flowing through the airflow grooves 380 may create vortices or turbulence that helps prevent sticker stain. Further, air flowing through the airflow grooves 380 helps increase a rate at which materials immediately adjacent to the sticker 300 dry and/or cure.

Figure 6:
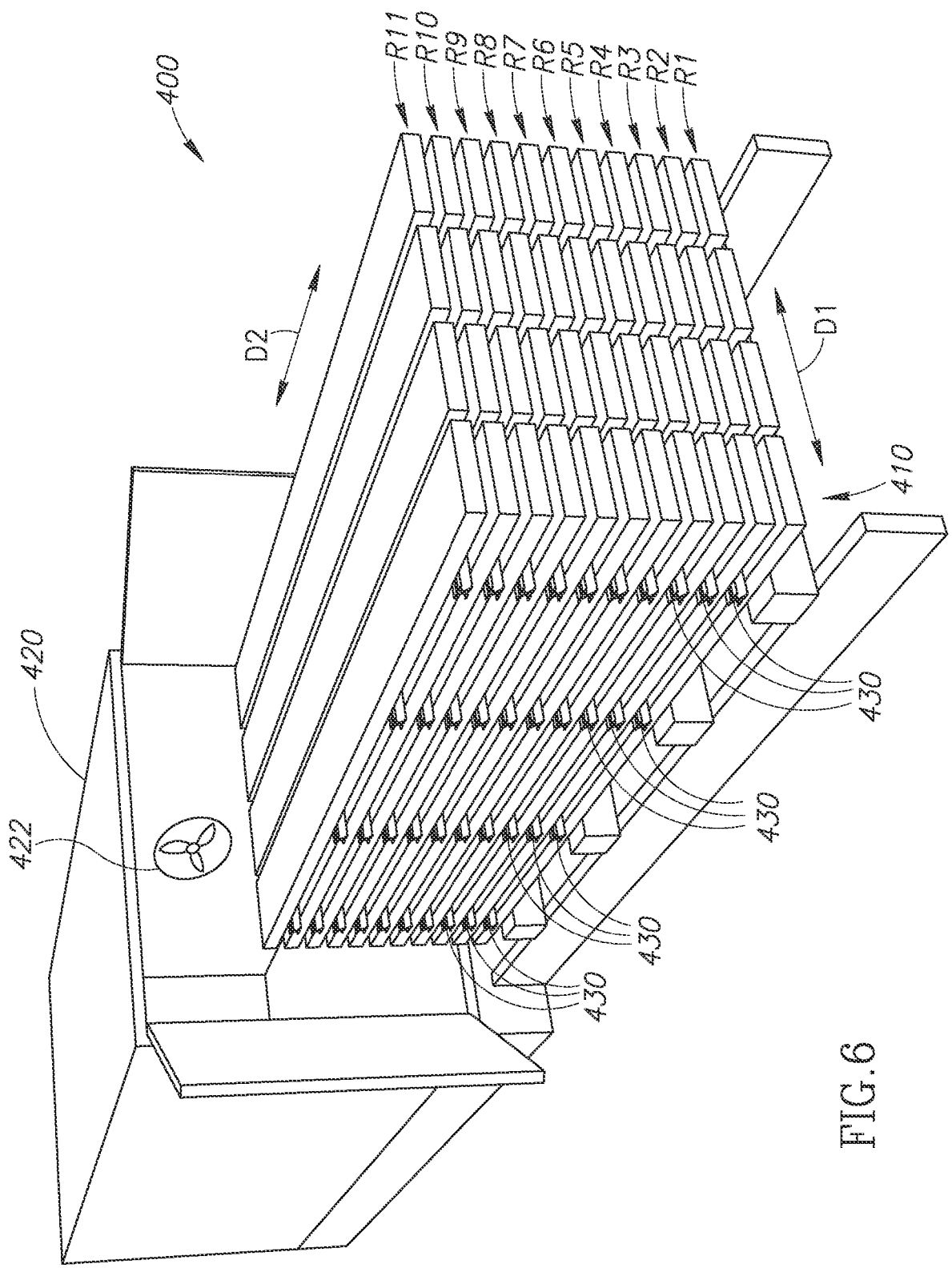
FIG. 6 is a perspective view of a stack of lumber including a plurality of stickers each like the sticker of FIG. 1.

FIG. 6 depicts a stack 400 ready to be placed inside a kiln 420. The stack 400 includes a plurality of spaced apart stickers 430 that each extends longitudinally along a first direction (identified by a double headed arrow "D1"), and a plurality of boards 410 that each extends longitudinally along a second direction (identified by a double headed arrow "D2").

The stack 400 may be characterized as including a plurality of vertically stacked rows R1-R11. Vertically adjacent pairs of the rows R1-R11 are separated from one another by two or more of the stickers 430 spaced apart from one another along the second direction (identified by the double-headed arrow "D2"). Within each of the rows R2-R11, one or more of the boards 410 are arranged along the first direction (identified by the double-headed arrow "D1") and stacked upon two or more of the sticker 430. For example, in FIG. 6, within each of the rows R2-R11, four of the boards 410 are stacked upon four of the stickers 430 (that are spaced apart from one another along the second direction). Within each of the rows R1-R11, those boards within the row (e.g., the row R11) may be spaced apart from one another along the first direction (identified by the double headed arrow "D1") to allow air to flow in between them.

The stack 400 may be constructed by positioning one or more of the boards 410 to extend along the second direction and define the row R1. Then, at least two of the stickers 430 (oriented to extend along the first direction) are positioned directly on top of boards of the row R1. Next, the row R2 is defined by positioning one or more of the boards 410 (oriented to extend along the second direction) directly on top of those stickers positioned on top of the row R1. The rows R3-R11 may be added to the stack 400 by alternatingly adding at least two of the stickers 430 (oriented to extend along the first direction) and one or more of the boards 410 (oriented to extend along the second direction) to the stack 400.

In FIG. 6, each of the stickers 430 has been illustrated as being an implementations of the sticker 100 (see FIG. 1-3). However, each of the stickers 430 could be implemented using the sticker 300 instead. Further, a first portion of the stickers 430 could each be implemented using the sticker 100, and a second portion of the stickers 430 could each be implemented using the sticker 300.

As explained above, the stickers 100 and 300 may include the grooves 180 and 380, respectively. In such embodiments, the grooves 180 and 380 provide cross ventilation that allows air to pass alongside the boards 410 at those locations whereat the stickers 430 contact the boards. Thus, air is able to pass through the stack 400, alongside the boards 410 (even where the boards 410 contact the stickers 430), and reduce sticker stain on the boards 410.

The kiln 420 may include one or more fans 422 configured to circulate air inside the kiln 420. After the stack 400 is placed inside the kiln 420, the drying and/or curing process begins. During the drying and/or curing process, a temperature inside the kiln 420 may be increased and/or the one or more fans 422 may be activated to blow air toward the stack 400. Air (e.g., circulated by the one or more fans 422) travels between the boards 410 and through the channels (e.g., the channels 141, 142, 151, and 152 of the sticker 100 or the channels 341-344, 351, and 352 of the sticker 300) of the stickers 430. Further, the air may travel through the airflow grooves (e.g., the airflow grooves 180 of the sticker 100 or the airflow grooves 380 of the sticker 300) of the stickers 430, if present.

When the boards 410 are dry, the stack 400 is removed from the kiln 420.

As mentioned above, conventional wooden stickers absorb (or wick) moisture. Additionally, conventional wooden stickers often contain tree sap, which promotes the growth of mold. In contrast, the stickers 100 and 300 are constructed from a material that does not absorb (or wick) moisture. Additionally, the stickers 100 and 300 may be constructed from a material that resists mold and/or does not provide a growth medium (e.g., wood, sap, and the like) for mold. Thus, the stickers 100 and 300 help avoid sticker stain. By way of a non-limiting example, the stickers 100 and 300 may be constructed from a material other than solid wood, such as an inorganic material. By way of additional non-limiting examples, the stickers 100 and 300 may be constructed from aluminum, a material that includes aluminum (e.g., an aluminum alloy), plastic, carbon fiber, and the like. Non-limiting examples of suitable aluminum alloys that may be used to construct the stickers 100 and 300 include 6063-T6 and A6005.

By way of a non-limiting example, aluminum or an aluminum alloy may be extruded to form the stickers 100 and 300. By using aluminum or an aluminum alloy, the stickers 100 and 300 may have improved uniformity (both in terms of flatness and straightness) compared to conventional wooden stickers. Thus, the materials stacked upon and separated by a plurality of the stickers 100 and/or the stickers 300 will dry or cure straighter and/or flatter. This helps improve productivity and/or yield of a processing facility and allows the materials to be manufactured with closer tolerances. Further, the stickers 100 and 300 may have better dimensional stability and strength compared to conventional wooden stickers. This allows the stickers 100 and 300 to return to their original shape even after being subjected to multiple cycles of the drying and/or curing process, each of which subjects the stickers 100 and 300 to heat, moisture, and pressure.

Air may flow more consistently (e.g., at a more consistent speed) through materials stacked using the stickers 100 and 300 than through materials stacked using conventional wooden stickers because the stickers 100 and 300 are straighter and/or flatter. Thus, more consistent pathways for airflows are defined within the stack (e.g., the stack 210, the stack 400, and the like). Referring to FIG. 6, when two or more substantially similar stacks are placed inside the kiln 420, those stacks will have dimensions that are more consistent. Thus, the stacks may be better aligned with one another inside the kiln 420. This allows for smoother and/or more consistent airflow through, between, and around the stacks.

As is appreciated by those of ordinary skill in the art, conventional wood stickers and separators tend to absorb moisture and require additional drying prior to the main drying process. An amount of energy required to dry materials (e.g., lumber) may be reduced by using a material (e.g., aluminum, an aluminum alloy, and the like) to construct the stickers 100 and 300 that does not absorb (or wick) moisture and has suitable heat transfer characteristics. Using a material (e.g., aluminum, an aluminum alloy, and the like) to construct the stickers 100 and 300 that provides a heat transfer rate (or thermal conductivity) that is greater than that of wood helps reduce the amount of energy needed to dry and/or cure materials, and helps bring the temperature of those materials up to a desired temperature more quickly.

Using a material (e.g., aluminum, an aluminum alloy, and the like) to construct the stickers 100 and 300 that does not absorb (or wick) moisture helps reduce the size of the thermal mass that needs to be heated to effectuate the drying process because the stickers 100 and 300 themselves do not need to dry. Further, when the stickers 100 and 300 are constructed using aluminum or an aluminum alloy, they can withstand higher temperatures than conventional wooden stickers.

When the stickers 100 and 300 are constructed using a material that includes aluminum (e.g., aluminum, an aluminum alloy, and the like) the stickers 100 and 300 may be lighter in weight than conventional wooden stickers.

Conventional wooden stickers have rough outer surfaces. Airflow within and alongside the stickers 100 and 300 may be improved by constructed them using a material (e.g., aluminum, an aluminum alloy, and the like) and/or process (e.g., extrusion) that provides finished (or substantially smooth) surfaces. Such surfaces also help avoid injuries to users that may be caused by sharp edges and/or slivers that may be present in wooden stickers.

Unlike conventional wooden stickers and separators, which can lose their strength and dimensional stability, the stickers 100 and 300 may be constructed using a recycled and recyclable material (e.g., aluminum, an aluminum alloy, and the like) that has a much longer useful life. When the stickers 100 and 300 are worn out, damaged, or otherwise rendered unusable, the stickers 100 and 300 may be recycled and new stickers 100 and 300 constructed from the recycled material.

Because of the qualities described above, the stickers 100 and 300 may be used to implement an improved drying and/or curing process that is faster, more uniform, and uses less energy than prior art drying and/or curing processes. Further, the improved drying and/or curing process may produce an end product (e.g., lumber, cement board, and the like) that is flatter and more uniform than can be achieved by prior art drying and/or curing processes.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A separator comprising:
an elongated central portion extending along a longitudinal axis;
a plurality of support members extending radially outwardly from the elongated central portion, the plurality of support members comprising first, second, third, and fourth support members;
a plurality of open-ended channels each defined between a different adjacent pair of the plurality of support members, each of the plurality of open-ended channels extending along the longitudinal axis and being configured to allow air to flow therethrough, the plurality of open-ended channels comprising first, second, third, and fourth open-ended channels, the first open-ended channel being positioned between the first and second support members, the second open-ended channel being positioned between the third and fourth support members, the third open-ended channel being positioned between the second and third support members, the fourth open-ended channel being positioned between the first and fourth support members; and a plurality of support platforms comprising first, second, third, and fourth support platforms, the first support platform comprising a longitudinally extending first inner edge opposite a longitudinally extending first outer edge, the first support member being connected to the first support platform between the first inner edge and the first outer edge, the first support platform having an outwardly facing first support surface that extends from the first inner edge to the first outer edge, the first support surface comprising first grooves that extend laterally across the first support surface from the first outer edge to the first inner edge, the second support platform comprising a longitudinally extending second inner edge opposite a longitudinally extending second outer edge, the second support member being connected to the second support platform between the second inner edge and the second outer edge, the second support platform having an outwardly facing second support surface that extends from the second inner edge to the second outer edge, the second support surface comprising second grooves that extend laterally across the second support surface from the second outer edge to the second inner edge, the third support platform comprising a longitudinally extending third inner edge opposite a longitudinally extending third outer edge, the third support member being connected to the third support platform between the third inner edge and the third outer edge, the third support platform having an outwardly facing third support surface that extends from the third inner edge to the third outer edge, the third support surface comprising third grooves that extend laterally across the third support surface from the third outer edge to the third inner edge, the fourth support platform comprising a longitudinally extending fourth inner edge opposite a longitudinally extending fourth outer edge, the fourth support member being connected to the fourth support platform between the fourth inner edge and the fourth outer edge, the fourth support platform having an outwardly facing fourth support surface that extends from the fourth inner edge to the fourth outer edge, the fourth support surface comprising fourth grooves that extend laterally across the fourth support surface from the fourth outer edge to the fourth inner edge, the first, second, third, and fourth grooves being configured to allow air to flow therethrough, the first and second support platforms extending toward one another with the first and second inner edges defining a first opening into the first open-ended channel, the third and fourth support platforms extending toward one another with the third and fourth inner edges defining a second opening into the second open-ended channel, the second and third support platforms defining a longitudinally extending third opening into the third open-ended channel, a first distance being defined between the second and third support platforms at the third opening, the first distance being greater than a distance defined between the second and third support members within the third open-ended channel, the first and fourth support platforms defining a longitudinally extending fourth opening into the fourth open-ended channel, a second distance being defined between the first and fourth support platforms at the fourth opening, the second distance being greater than a distance defined between the first and fourth support members within the fourth open-ended channel.

2. The separator of claim 1 constructed from a material having a higher thermal conductivity than wood.

3. The separator of claim 1, wherein together the elongated central portion and at least a portion of the plurality of support members have an X-shaped cross-sectional shape.

4. The separator of claim 1, wherein the plurality of support members comprises fifth and sixth support members,
the fifth support member is positioned between the first and second support members,
the sixth support member is positioned between the third and fourth support members, and
the fifth and sixth support members are both substantially vertical and substantially collinear.

5. The separator of claim 4, wherein a fifth support platform is connected to the fifth support member, and
a sixth support platform is connected to the sixth support member such that together the elongated central portion, the fifth and sixth support members, and the fifth and sixth support platforms have an I-beam shaped cross-sectional shape.

6. The separator of claim 5, wherein together the elongated central portion and the first, second, third, and fourth support members have an X-shaped cross-sectional shape.

7. The separator of claim 1, wherein the elongated central portion, the plurality of support members, and the plurality of support platforms are each constructed entirely of a material that includes aluminum.

8. The separator of claim 1, wherein the elongated central portion, the plurality of support members, and the plurality of support platforms are each constructed entirely of aluminum or an aluminum alloy.

9. The separator of claim 1, wherein the first grooves are configured to receive first air from outside one or both of the first outer edge and the first inner edge, the first grooves allowing the first air to flow therethrough to help evaporate any liquids or moisture adjacent or alongside the first grooves,
the second grooves are configured to receive second air from outside one or both the second outer edge and the second inner edge, the second grooves allowing the second air to flow therethrough to help evaporate any liquids or moisture adjacent or alongside the second grooves,
the third grooves are configured to receive third air from outside one or both of the third outer edge and the third inner edge, the third grooves allowing the third air to flow therethrough to help evaporate any liquids or moisture adjacent or alongside the third grooves, and
the fourth grooves are configured to receive fourth air from outside one or both of the fourth outer edge and the fourth inner edge, the fourth grooves allowing the fourth air to flow therethrough to help evaporate any liquids or moisture adjacent or alongside the fourth grooves.

10. The separator of claim 9, wherein the first, second, third, and fourth grooves are configured such that the first, second, third, and fourth air create vortices or turbulence that helps prevent sticker stain.

11. The separator of claim 1, wherein the first grooves define first X-shaped patterns on the first support surface,
the second grooves define second X-shaped patterns on the second support surface,
the third grooves define third X-shaped patterns on the third support surface, and
the fourth grooves define fourth X-shaped patterns on the fourth support surface.

12. The separator of claim 1, wherein
the first and second support surfaces are configured to rest upon a first item in a stack, and
the third and fourth support surfaces are configured to support a different second item in the stack.

13. The separator of claim 1, wherein the first, second, third, and fourth grooves are configured such that air flowing therethrough creates vortices or turbulence that helps prevent sticker stain.

14. A sticker comprising:
an elongated central portion that extends along a longitudinal axis;
first, second, third, and fourth support members that extend radially outwardly from the elongated central portion;
first, second, third, and fourth support platforms connected to the first, second, third, and fourth support members, respectively, the first, second, third, and fourth support platforms having outwardly facing first, second, third, and fourth support surfaces, respectively, the first, second, third, and fourth support surfaces having first, second, third, and fourth grooves, respectively, formed therein, each of the first, second, third, and fourth support platforms having an inner edge portion opposite an outer edge portion, the first grooves extending laterally across the first support surface from the inner edge portion of the first support platform to the outer edge portion of the first support platform, the first support member being connected to the first support platform between the inner edge portion of the first support platform and the outer edge portion of the first support platform, the second support member being connected to the second support platform between the inner edge portion of the second support platform and the outer edge portion of the second support platform, the second grooves extending laterally across the second support surface from the inner edge portion of the second support platform to the outer edge portion of the second support platform, the third support member being connected to the third support platform between the inner edge portion of the third support platform and the outer edge portion of the third support platform, the third grooves extending laterally across the third support surface from the inner edge portion of the third support platform to the outer edge portion of the third support platform, the fourth support member being connected to the fourth support platform between the inner edge portion of the fourth support platform and the outer edge portion of the fourth support platform, the fourth grooves extending laterally across the fourth support surface from the inner edge portion of the fourth support platform to the outer edge portion of the fourth support platform, the first, second, third, and fourth grooves being configured to allow air to flow therethrough;
an open-ended longitudinally extending first channel defined between the first and second support members, the inner edge portions of the first and second support platforms extending alongside the first channel toward one another;
an open-ended longitudinally extending second channel defined between the second and third support members, the second and third support platforms defining a longitudinally extending second opening into the second channel, a first distance being defined between the second and third support platforms at the second opening, the first distance being greater than a distance defined between the second and third support members within the second channel;
an open-ended longitudinally extending third channel defined between the third and fourth support members, the inner edge portions of the third and fourth support platforms extending alongside the third channel toward one another; and
an open-ended longitudinally extending fourth channel defined between the fourth and first support members, the first and fourth support platforms defining a longitudinally extending fourth opening into the fourth channel, a second distance being defined between the first and fourth support platforms at the fourth opening, the second distance being greater than a distance defined between the first and fourth support members within the fourth channel, the first, second, third, and fourth channels each being configured to allow air to flow therethrough.

15. The sticker of claim 14, wherein the first, second, third, and fourth support surfaces are each planar,
the second support surface is substantially coplanar with the first support surface,
the fourth support surface is substantially coplanar with the third support surface,
the first and second support surfaces face in a first direction, and
the third and fourth support surfaces face in a second direction opposite the first direction.

16. The sticker of claim 15, wherein
the first, second, third, and fourth grooves are configured such that the air flowing therethrough creates vortices or turbulence that helps prevent sticker stain.

17. The sticker of claim 14 constructed entirely of a material that includes aluminum.

18. The sticker of claim 14, wherein the elongated central portion and the first, second, third, and fourth support members have an X-shaped cross-sectional shape in which the first and third support members are substantially collinear, and the second and fourth support members are substantially collinear.

19. The sticker of claim 18, wherein an inside angle defined between the first and second support members is greater than 90° and an inside angle defined between the first and fourth support members is less than 90°.

20. A method comprising:
positioning a first material to define a first row of a stack;
positioning at least two stickers directly on top of the first material, each of the stickers being constructed from aluminum or an aluminum alloy;
positioning a second material directly on top of the stickers to define a second row of the stack; and
allowing the first and second materials to dry or cure within the stack, wherein each of the stickers comprises:
an elongated central portion extending along a longitudinal axis;
a plurality of support members extending radially outwardly from the elongated central portion, the plurality of support members comprising first, second, third, and fourth support members;
a plurality of open-ended channels each defined between a different adjacent pair of the plurality of support members, each of the plurality of open-ended channels extending along the longitudinal axis and being configured to allow air to flow therethrough, the plurality of open-ended channels comprising first, second, third, and fourth open-ended channels, the first open-ended channel being positioned between the first and second support members, the second open-ended channel being positioned between the third and fourth support members, the third open-ended channel being positioned between the second and third support members, the fourth open-ended channel being positioned between the first and fourth support members; and a plurality of support platforms comprising first, second, third, and fourth support platforms connected to the first, second, third, and fourth support members, respectively, the first support platform comprising a longitudinally extending first inner edge opposite a longitudinally extending first outer edge, the second support platform comprising a longitudinally extending second inner edge opposite a longitudinally extending second outer edge, the third support platform comprising a longitudinally extending third inner edge opposite a longitudinally extending third outer edge, the fourth support platform comprising a longitudinally extending fourth inner edge opposite a longitudinally extending fourth outer edge, the first and second support platforms extending toward one another with the first and second inner edges defining a first opening into the first open-ended channel, the third and fourth support platforms extending toward one another with the third and fourth inner edges defining a second opening into the second open-ended channel, the second and third support platforms defining a longitudinally extending third opening into the third open-ended channel, a first distance being defined between the second and third support platforms at the third opening, the first distance being greater than a distance defined between the second and third support members within the third open-ended channel, the first and fourth support platforms defining a longitudinally extending fourth opening into the fourth open-ended channel, a second distance being defined between the first and fourth support platforms at the fourth opening, the second distance being greater than a distance defined between the first and fourth support members within the fourth open-ended channel.

21. The method of claim 20, further comprising:
placing the stack in a kiln comprising one or more fans configured to circulate air within the kiln, at least a portion of the air circulated by the one or more fans flowing through the first, second, third, and fourth open-ended channels of each of the stickers.

22. The method of claim 20, wherein the first support platform has an outwardly facing first planar support surface that extends from the first inner edge and the first outer edge,
the second support platform has an outwardly facing second planar support surface that extends from the second inner edge and the second outer edge,
the third support platform has an outwardly facing third planar support surface that extends from the third inner edge and the third outer edge,
the fourth support platform has an outwardly facing fourth planar support surface that extends from the fourth inner edge and the fourth outer edge,
the first planar support surface comprises first grooves that extend laterally across the first planar support surface from the first outer edge to the first inner edge,
the second planar support surface comprises second grooves that extend laterally across the second planar support surface from the second outer edge to the second inner edge,
the third planar support surface comprises third grooves that extend laterally across the third planar support surface from the third outer edge to the third inner edge,
the fourth planar support surface comprises fourth grooves that extend laterally across the fourth planar support surface from the fourth outer edge to the fourth inner edge, and
the first, second, third, and fourth grooves are configured to allow air to flow therethrough.

23. The method of claim 20, wherein the first support platform has an outwardly facing first concave support surface that extends from the first inner edge and the first outer edge,
the second support platform has an outwardly facing second concave support surface that extends from the second inner edge and the second outer edge,
the third support platform has an outwardly facing third concave support surface that extends from the third inner edge and the third outer edge, and
the fourth support platform has an outwardly facing fourth concave support surface that extends from the fourth inner edge and the fourth outer edge.

24. The separator of claim 1, wherein the first, second, third, and fourth support surfaces are each concave.

25. The sticker of claim 14, wherein the first, second, third, and fourth support surfaces are each concave.

26. A separator comprising:
an elongated central portion extending along a longitudinal axis;
a plurality of support members extending radially outwardly from the elongated central portion, the plurality of support members comprising first, second, third, and fourth support members;
a plurality of open-ended channels each defined between a different adjacent pair of the plurality of support members, each of the plurality of open-ended channels extending along the longitudinal axis and being configured to allow air to flow therethrough, the plurality of open-ended channels comprising first, second, third, and fourth open-ended channels, the first open-ended channel being positioned between the first and second support members, the second open-ended channel being positioned between the third and fourth support members, the third open-ended channel being positioned between the second and third support members, the fourth open-ended channel being positioned between the first and fourth support members; and
a plurality of support platforms comprising first, second, third, and fourth support platforms, the first support platform comprising a longitudinally extending first inner edge opposite a longitudinally extending first outer edge, the first support member being connected to the first support platform between the first inner edge and the first outer edge, the first support platform having an outwardly facing first concave support surface that extends from the first inner edge to the first outer edge, the second support platform comprising a longitudinally extending second inner edge opposite a longitudinally extending second outer edge, the second support member being connected to the second support platform between the second inner edge and the second outer edge, the second support platform having an outwardly facing second concave support surface that extends from the second inner edge to the second outer edge, the third support platform comprising a longitudinally extending third inner edge opposite a longitudinally extending third outer edge, the third support member being connected to the third support platform between the third inner edge and the third outer edge, the third support platform having an outwardly facing third concave support surface that extends from the third inner edge to the third outer edge, the fourth support platform comprising a longitudinally extending fourth inner edge opposite a longitudinally extending fourth outer edge, the fourth support member being connected to the fourth support platform between the fourth inner edge and the fourth outer edge, the fourth support platform having an outwardly facing fourth concave support surface that extends from the fourth inner edge to the fourth outer edge, the first and second support platforms extending toward one another with the first and second inner edges defining a first opening into the first open-ended channel, the third and fourth support platforms extending toward one another with the third and fourth inner edges defining a second opening into the second open-ended channel, the second and third support platforms defining a longitudinally extending third opening into the third open-ended channel, a first distance being defined between the second and third support platforms at the third opening, the first distance being greater than a distance defined between the second and third support members within the third open-ended channel, the first and fourth support platforms defining a longitudinally extending fourth opening into the fourth open-ended channel, a second distance being defined between the first and fourth support platforms at the fourth opening, the second distance being greater than a distance defined between the first and fourth support members within the fourth open-ended channel.

27. The separator of claim 26 constructed from a material having a higher thermal conductivity than wood.

28. The separator of claim 26, wherein together the elongated central portion and at least a portion of the plurality of support members have an X-shaped cross-sectional shape.

29. The separator of claim 26, wherein the plurality of support members comprises fifth and sixth support members,
the fifth support member is positioned between the first and second support members,
the sixth support member is positioned between the third and fourth support members, and
the fifth and sixth support members are both substantially vertical and substantially collinear.

30. The separator of claim 29, wherein a fifth support platform is connected to the fifth support member, and
a sixth support platform is connected to the sixth support member such that together the elongated central portion, the fifth and sixth support members, and the fifth and sixth support platforms have an I-beam shaped cross-sectional shape.

31. The separator of claim 30, wherein together the elongated central portion and the first, second, third, and fourth support members have an X-shaped cross-sectional shape.

32. The separator of claim 26, wherein the elongated central portion, the plurality of support members, and the plurality of support platforms are each constructed entirely of a material that includes aluminum.

33. The separator of claim 26, wherein the elongated central portion, the plurality of support members, and the plurality of support platforms are each constructed entirely of aluminum or an aluminum alloy.

34. The separator of claim 26, wherein the first and second concave support surfaces are configured to rest upon a first item in a stack, and
the third and fourth concave support surfaces are configured to support a different second item in the stack.

35. A sticker comprising:
an elongated central portion that extends along a longitudinal axis;
first, second, third, and fourth support members that extend radially outwardly from the elongated central portion;
first, second, third, and fourth support platforms connected to the first, second, third, and fourth support members, respectively, the first, second, third, and fourth support platforms having outwardly facing first, second, third, and fourth concave support surfaces, respectively, each of the first, second, third, and fourth support platforms having an inner edge portion opposite an outer edge portion, the first support member being connected to the first support platform between the inner edge portion of the first support platform and the outer edge portion of the first support platform, the second support member being connected to the second support platform between the inner edge portion of the second support platform and the outer edge portion of the second support platform, the third support member being connected to the third support platform between the inner edge portion of the third support platform and the outer edge portion of the third support platform, the fourth support member being connected to the fourth support platform between the inner edge portion of the fourth support platform and the outer edge portion of the fourth support platform;
an open-ended longitudinally extending first channel defined between the first and second support members, the inner edge portions of the first and second support platforms extending alongside the first channel toward one another;
an open-ended longitudinally extending second channel defined between the second and third support members, the second and third support platforms defining a longitudinally extending second opening into the second channel, a first distance being defined between the second and third support platforms at the second opening, the first distance being greater than a distance defined between the second and third support members within the second channel;
an open-ended longitudinally extending third channel defined between the third and fourth support members, the inner edge portions of the third and fourth support platforms extending alongside the third channel toward one another; and
an open-ended longitudinally extending fourth channel defined between the fourth and first support members, the first and fourth support platforms defining a longitudinally extending fourth opening into the fourth channel, a second distance being defined between the first and fourth support platforms at the fourth opening, the second distance being greater than a distance defined between the first and fourth support members within the fourth channel, the first, second, third, and fourth channels each being configured to allow air to flow therethrough.

36. The sticker of claim 35 constructed entirely of a material that includes aluminum.

37. The sticker of claim 35, wherein the elongated central portion and the first, second, third, and fourth support members have an X-shaped cross-sectional shape in which the first and third support members are substantially collinear, and the second and fourth support members are substantially collinear.

38. The sticker of claim 37, wherein an inside angle defined between the first and second support members is greater than 90° and an inside angle defined between the first and fourth support members is less than 90°.

\* \* \* \* \*